(12) United States Patent
Tajima

(10) Patent No.: US 7,088,267 B2
(45) Date of Patent: Aug. 8, 2006

(54) DUPLEX-SYSTEM DIGITAL-DATA TRANSMITTING METHOD AND APPARATUS

(75) Inventor: Shigeru Tajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 527 days.

(21) Appl. No.: 09/728,169

(22) Filed: Dec. 1, 2000

(65) Prior Publication Data

US 2001/0002924 A1    Jun. 7, 2001

(30) Foreign Application Priority Data

Dec. 2, 1999   (JP)   ................... 11-342840

(51) Int. Cl.
*H03K 17/94*    (2006.01)
(52) U.S. Cl. .................. 341/33; 375/271; 375/272; 375/219; 455/13.1; 455/434; 455/41.1; 370/209; 370/280; 713/182; 340/10; 307/149; 345/156
(58) Field of Classification Search ............... 713/182; 455/100, 13.1, 434, 41.1; 341/33; 345/156; 307/149; 340/562, 10.1; 375/377, 271, 375/219, 272; 370/209, 280; 327/552
See application file for complete search history.

(56) References Cited

U.S. PATENT DOCUMENTS

| | | | | |
|---|---|---|---|---|
| 4,475,216 A | * | 10/1984 | Noguchi ................... | 375/272 |
| 4,763,340 A | * | 8/1988 | Yoneda et al. .............. | 375/377 |
| 5,796,827 A | * | 8/1998 | Coppersmith et al. ...... | 713/182 |
| 5,811,897 A | * | 9/1998 | Spaude et al. .............. | 307/149 |
| 5,825,814 A | * | 10/1998 | Detwiler et al. ............ | 375/219 |
| 5,914,701 A | * | 6/1999 | Gersheneld et al. ........ | 345/156 |
| 6,211,799 B1 | * | 4/2001 | Post et al. ................... | 341/33 |
| 6,223,018 B1 | * | 4/2001 | Fukumoto et al. ......... | 455/41.1 |
| 6,429,733 B1 | * | 8/2002 | Pagliolo et al. ............ | 327/552 |
| 6,452,909 B1 | * | 9/2002 | Bauer ......................... | 370/280 |

(Continued)

FOREIGN PATENT DOCUMENTS

JP      07-170215   *  7/1995

OTHER PUBLICATIONS

E.R. Post, M. Reynolds et al.; Intrabody Buses for Data and Power; Oct. 13-14, 1997; Digest of Papers, First International Symposium on Wearable Computers; pp. 52-55.*

(Continued)

*Primary Examiner*—Emmanuel Bayard
*Assistant Examiner*—Sudhanshu C. Pathak
(74) *Attorney, Agent, or Firm*—Finnegan, Henderson, Farabow, Garrett & Dunner, L.L.P.

(57) ABSTRACT

A duplex-system digital-data transmitting apparatus includes a digital-data signal source which outputs serial data at a signal output end. The level of the data is converted by a first level converter circuit. The data is supplied to an FSK modulator circuit to be FSK-modulated. Carriers are, for example, at 11 MHz and 13 MHz and correspond to digital signals "1" and "0", respectively. The modulated signal is amplified by a driver and is coupled to the human body by a capacitor of about 100 pF. When the human body comes into contact with an electrode, the modulated signal transmitted through the human body is amplified by a pre-amplifier, demodulated by a demodulator circuit, and shaped by a comparator. The level of the shaped signal is converted by a second level converter circuit, and the signal is supplied to a serial input end of a receiving unit. Transmission and reception are performed using a half-duplex system.

2 Claims, 4 Drawing Sheets

U.S. PATENT DOCUMENTS

| | | | |
|---|---|---|---|
| 6,542,716 B1 * | 4/2003 | Dent et al. | 455/13.1 |
| 6,642,837 B1 * | 11/2003 | Vigoda et al. | 340/10.1 |
| 6,671,250 B1 * | 12/2003 | Schiff | 370/209 |
| 2001/0023185 A1 * | 9/2001 | Hakkinen et al. | 455/434 |

OTHER PUBLICATIONS

T.G. Zimmerman; Peersonal Area Networks:Near-Field intrabody Communications;1996; IBM Systems Journal, vol. 35, No. 3&4; pp. 609-617.*

Zimmerman (Personal Area Networks (PAN): Near-Field Intra-Body Communications; B.S. Humanities and Engineering; MIT; Feb. 1980).*

Thomas Guthrie Zimmerman: "Personal Area Networks (PAN) : Near-Field Intra-Body Communication" B.S., Humanities and Engineering, Massachusetts Institute of Technology, Feb. 1980.

* cited by examiner

DUPLEX-SYSTEM DIGITAL-DATA TRANSMITTING METHOD AND APPARATUS

BACKGROUND OF THE INVENTION

1. Field of the Invention

The present invention relates to technology for performing duplex-system (bidirectional) digital communication using the human body.

2. Description of the Related Art

Recently, more and more general users have started to perform transmission and reception of digital data as information devices have become widely used. Personal digital assistants (PDAs), portable personal computers, wearable computers, cellular phones, and the like are used to perform transmission and reception of mail and to download and upload content data. In addition, game programs and music information are downloaded using information kiosks at convenience stores. Such transmission and reception of digital data require predetermined adapters and connectors. It is cumbersome to prepare cables in advance and to configure them. It is expected that such cumbersome work will become more noticeable as digital data become distributed more widely among general consumers.

There is a known method of implementing communication between a transmitter for transmitting extremely weak (not strong enough to perform mutual communication) radio waves and a receiver by amplifying the radio waves using the human body as a medium, thereby transmitting audio signals and video signals (Japanese Unexamined Patent Application Publication No. 7-170215). It is desirable to facilitate transmission and reception of digital data by making best use of such a transmission method.

SUMMARY OF THE INVENTION

In view of the above circumstances, it is an object of the present invention to provide technology for facilitating transmission and reception of digital data by establishing a connection with a user.

In order to achieve the foregoing objects, a duplex-system digital-data transmitting method according to an aspect of the present invention is provided including a converting step of converting a digital signal transmitted from a digital signal source into a signal in a form that is transmittable through a human body. In a reconverting step, the signal that is transmittable through the human body is reconverted into the original digital signal. In a transmitting step, the digital signal is transmitted using a duplex transmission system.

In this arrangement, the digital signal can be transmitted using the human body, thereby easily transmitting and receiving digital data.

In this arrangement, full-duplex transmission may be performed by frequency modulation using two different frequencies when using the foregoing duplex transmission system. It is also possible to perform amplitude modulation (amplitude shift keying (ASK)) or code modulation using a spread spectrum system. Also, digital data may be transmitted using a half-duplex system.

In order to achieve the foregoing objects, a duplex-system digital-data transmitting apparatus according to another aspect of the present invention is provided including a first receiving unit for receiving a digital signal from a digital signal source. A converting unit converts the digital signal into a signal in a form that is transmittable through a human body. A transmitting unit transmits the signal in the form that is transmittable through the human body to the human body. A second receiving unit receives the signal in the form that is transmittable through the human body from the human body. A reconverting unit reconverts the received signal in the form that is transmittable through the human body into the original digital signal. An output unit outputs the reconverted digital signal. Transmission of the signal to the human body and reception of the signal from the human body are performed using a duplex transmission system.

By using the duplex-system digital-data transmitting apparatus with the above arrangement, duplex-system transmission of digital data using the human body is facilitated.

As a transmission channel, a transmission channel using frequency modulation (frequency shift keying (FSK)) can be used. In this case, it is preferable that the digital-data transmitting apparatus have a function for performing frequency modulation in a plurality of different frequency bands and a function for demodulating the frequency-modulated signals in the frequency bands. For example, when receiving and demodulating a signal modulated at a predetermined frequency, it is preferable to perform modulation at another frequency. When performing modulation at a predetermined frequency, it is preferable to demodulate the signal modulated at another frequency.

When transmission channels have different data rates, one transmission channel may be used to monitor a connection state of another transmission channel, thus maintaining the connection quality of the other transmission channel.

Also, functions of the duplex-system digital-data transmitting apparatus with the above arrangement may be included in, for example, a wearable computer or a portable terminal.

As described above, according to the present invention, duplex system digital transmission is facilitated by using the human body as a transmission channel. In particular, relatively high-speed digital transmission can be performed, and hence the present invention can be applied to a wearable computer or a mobile unit. Since digital transmission is performed by establishing a connection, information associated with an information device at a specific location or with an object including the information device is communicated by establishing a connection with the information device or the object. Within a short distance which is the size of human body, cables are not required for performing transmission and reception of data, thus relieving the cumbersome burden of using cables.

DESCRIPTION OF THE PREFERRED EMBODIMENTS

The present invention will be understood from the following description of a preferred embodiment with reference to the accompanying drawings.

Embodiment 1

Figure 1:
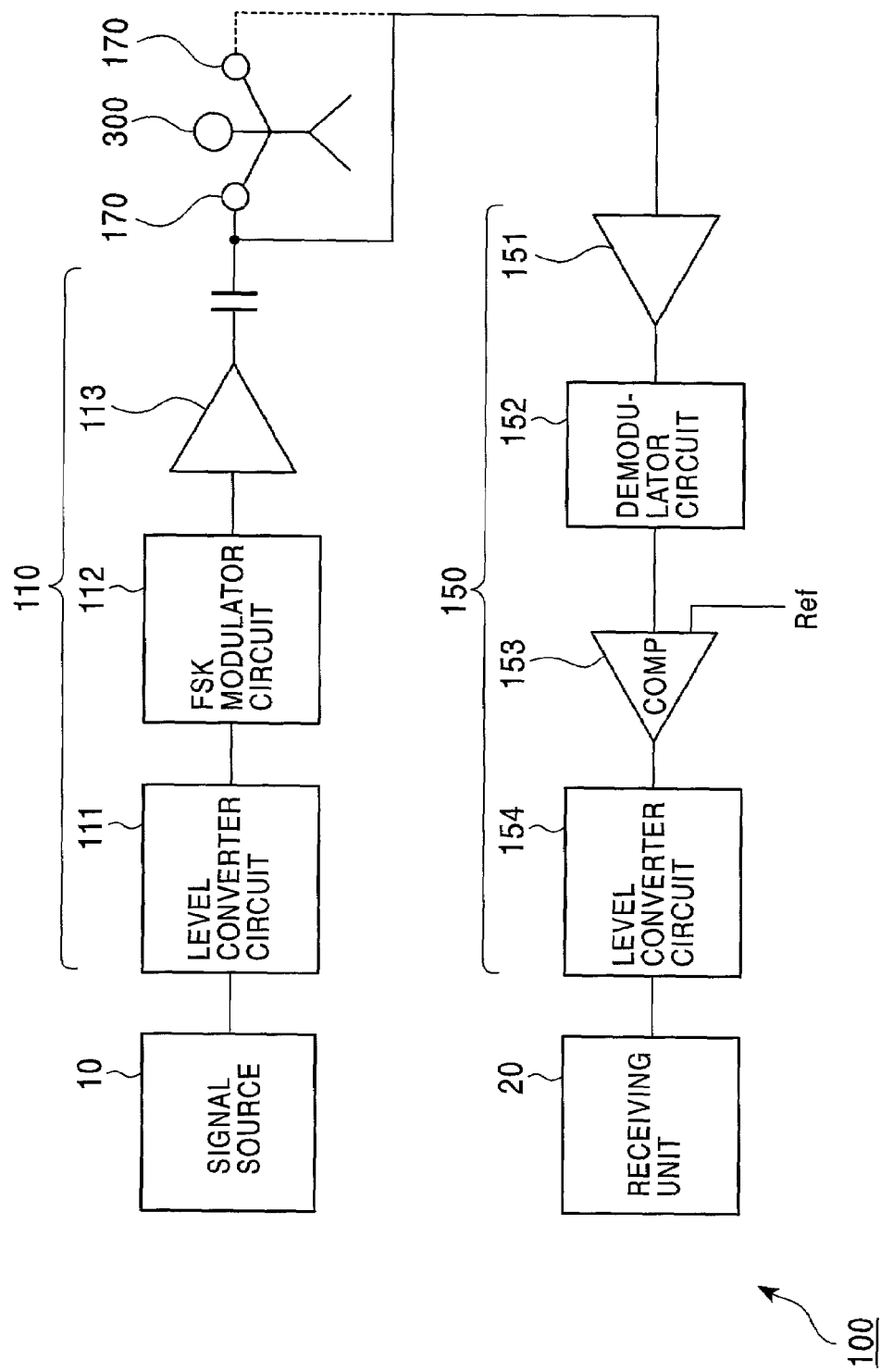
FIG. 1 is a block diagram of the structure of a first embodiment of the present invention.
Figure 2:
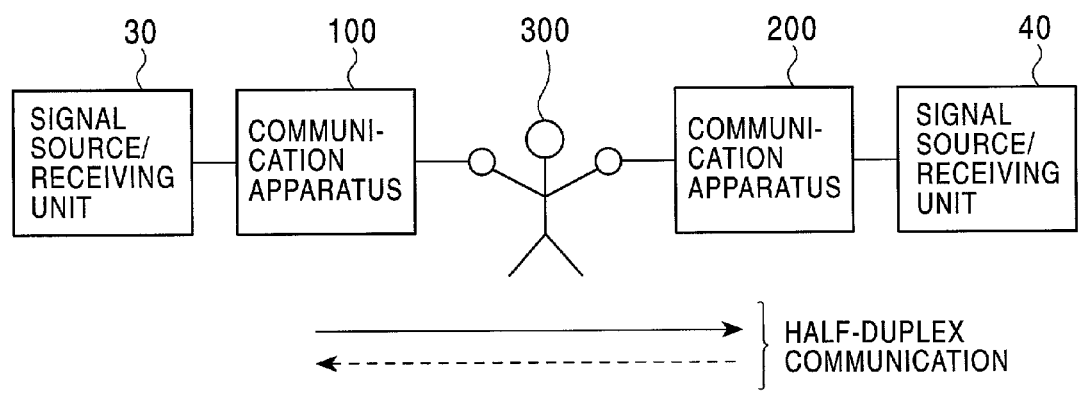
FIG. 2 is a block diagram of the overall structure of the first embodiment.

FIG. 1 shows the structure of a transmitter 110 and a receiver 150 of a human-body transmission and communication apparatus 100 according to a first embodiment of the present invention. The human-body transmission and communication apparatus 100 performs half-duplex digital communication with another human-body transmission and communication apparatus 200 (FIG. 2). The human-body transmission and communication apparatus 100 has substantially the same structure as that of the human-body transmission and communication apparatus 200. Referring to FIG. 1, a digital signal from a transmitter 110 of the human-body transmission and communication apparatus 100 is supplied to a receiver 150 of the human-body transmission and communication apparatus 200, as indicated by broken lines.

In FIG. 1, a digital-data signal source 10, such as a personal computer or the like, is connected to the transmitter 110 of the human-body transmission and communication apparatus 100. The transmitter 100 is used to perform transmission of digital signals using the human body. The transmitter 110 includes a level converter circuit 111, a frequency shift keying (FSK) modulator circuit 112, and a driver 113. The transmitter 110 is connected to a human body 300 through a capacitor of about 100 pF. An electrode 170 comes into contact with the human body 300.

A signal output end, such as an RS-232C port, of the digital-data signal source 10 outputs serial data, such as RS-232C output. The signal level of the serial data is converted by the level converter circuit 111, and the converted signal is supplied to the FSK modulator circuit 112 to be FSK-modulated. Carriers are, for example, at 11 MHz and 13 MHz, and the carriers correspond to digital signals "1" and "0", respectively. The modulated signal is amplified by the driver 113 to approximately 2 V, and the amplified signal is coupled to the human body 300 by the capacitor of about 100 pF.

The receiver 150 of the human-body transmission and communication apparatus 100 is connected to a receiving unit 20 formed of a personal computer or the like. The receiver 150 demodulates the signal transmitted through the human body 300 and supplies the demodulated signal to the receiving unit 20. When the receiving unit 20 is a personal computer, the personal computer serves both as the receiving unit 20 and the signal source 10. It is also possible to separately form the signal source 10 and the receiving unit 20. The receiver 150 of the human-body transmission and communication apparatus 100 includes a pre-amplifier 151, a demodulator circuit 152, a comparator 153, and a level converter circuit 154.

When the human body 300 comes into contact with the electrode 170, the demodulated signal transmitted through the human body 300 is amplified by the pre-amplifier 151, and the amplified signal is demodulated by the demodulator circuit 152. Furthermore, the demodulated signal is shaped by the comparator 153. Subsequently, the level of the shaped signal is converted by the level converter circuit 154, and the converted signal is supplied to a serial input end, such as an RS-232C port, of the receiving unit 20.

FIG. 2 shows establishment of a connection between a pair of signal source/receiving units 30 and 40 using the human-body transmission and communication apparatus 100 with the above arrangement and the human-body transmission and communication apparatus 200 with a similar arrangement. The signal source 10 and the receiving unit 20 shown in FIG. 1 are integrated into the signal source/receiving unit 30, such as a personal computer.

Referring to FIG. 2, the signal source/receiving unit 30 transmits digital data to another signal source/receiving unit 40 using the human-body transmission and communication apparatuses 100 and 200 using 11 MHz and 13 MHz carriers indicated by solid lines. Similarly, the other signal source/receiving unit 40 transmits digital data to the signal source/receiving unit 30 using the human-body transmission and communication apparatuses 100 and 200 using 11 MHz and 13 MHz carriers. Since transmission of digital data by the human-body transmission and communication apparatuses 100 and 200 in the direction of the solid-line arrow and in the direction of the broken-line arrow use the same carriers (11 MHz and 13 MHz), full-duplex communication cannot be performed. Hence, half-duplex communication is performed. Technology for transmitting digital data using the human body as in the first embodiment is implemented in connection with a physical layer, which is at the very bottom, of an open system interconnection (OSI) hierarchical model. Various protocols of layers above that layer can be used as protocols for the half-duplex communication. This point is not described here.

Technology for performing transmission using the human body using 11 MHz and 13 MHz carriers as in the first embodiment is described in detail in the above-mentioned Japanese Unexamined Patent Application Publication No. 7-170215. In the proposition made in this Patent Application Publication, video signals are successfully transmitted in substantially the same band. In the first embodiment, a data rate (bit rate) equal to or greater than 1 Mbps is easily achieved by FSK modulation (since PLL locking in demodulation does not require nine waves).

Embodiment 2

Figure 3:
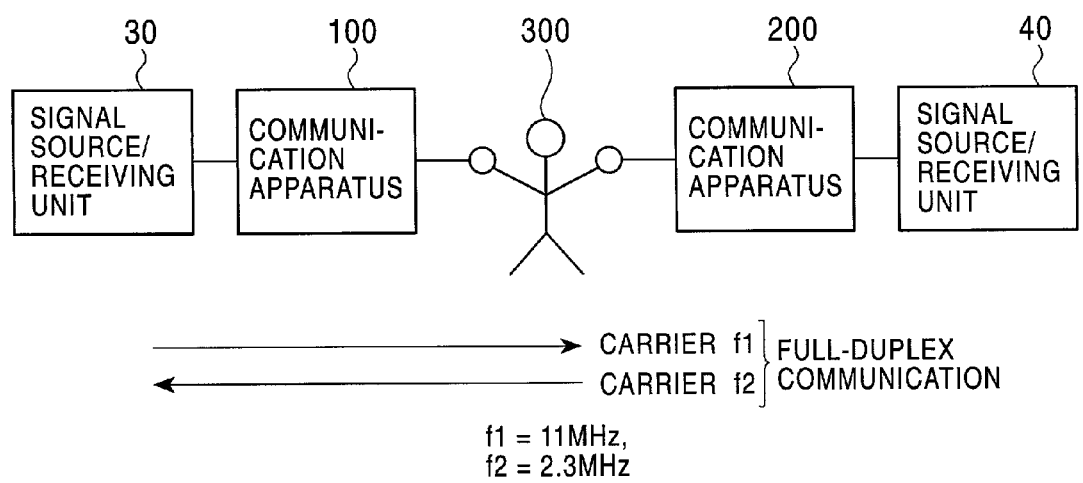
FIG. 3 is a block diagram illustrating the overall structure of a second embodiment of the present invention.

A second embodiment of the present invention is described next. In the second embodiment, a video signal band (11 MHz) used in the above-mentioned Japanese Unexamined Patent Application Publication No. 7-170215 and an audio signal band (2.3 MHz) are used to perform full-duplex digital communication. Referring to FIG. 3, the same reference numerals are given to components corresponding to those in FIG. 1.

In FIG. 3, a signal source/receiving unit 30 transmits digital data to another signal source/receiving unit 40 using a carrier f1 band (near 2.3 MHz). In contrast, the other signal source/receiving unit 40 transmits digital data to the signal source/receiving unit 30 using a carrier f2 band (near 11 MHz). The latter transmission is about five times faster than the former transmission. In other words, when the 11 MHz carrier is FSK-modulated, approximately nine waves are detected in a bit length if the data rate is 1 Mbps, as described above. This is sufficient for performing demodulation. When the same condition is imposed on the 2.3 MHz carrier, the data rate (bit rate) is approximately the ratio of the carrier frequencies, that is, $11/2.3 \approx 5$.

In the second embodiment, the video band in the above-mentioned Patent Application Publication and the one-channel audio band are used to perform full-duplex digital-data transmission.

The 11 MHz video signal frequency and the 2.3 MHz audio signal frequency (another audio channel uses 2.8 MHz) are generally used in an infrared wireless system. Hence, conventional devices and circuits can be used without any alteration.

In the above example, signal transmission in the direction of the solid-line arrow is modulated and demodulated at 2.3 MHz, whereas signal transmission in the direction of the broken-line arrow is modulated and demodulated at 11 MHz. Both the human-body transmission and communication apparatuses 100 and 200 are configured to perform modulation and demodulation at 2.3 MHz and 11 MHz, thus enabling signal transmission in both directions to be performed at 2.3 MHz and 11 MHz. In this case, negotiation may be conducted when performing full-duplex communication in order to decide which one will use which band.

Also, it is possible to use one of the transmission channels to monitor connection states, thus improving the connection quality of the other transmission channels.

Embodiment 3

A third embodiment of the present invention is described next. In the third embodiment, the band from 11 MHz to 13 MHz is divided into two bands, and full-duplex digital communication is performed.

Transmission bands used in the first embodiment and the second embodiment are for transmitting audio-visual signals using an infrared wireless system. Transmission of video signals requires at least a band of 3 to 4 MHz. In addition, it is necessary to maintain group delay and phase characteristics. In contrast, concerning digital signal transmission, it is sufficient to transmit only in binary. It is not necessary to have satisfactory phase characteristics over a wide band. Hence, it is possible to effectively utilize bands.

In view of the above points, the band from 11 MHz to 13 MHz is divided into two bands, and the two bands are separately used to perform transmission and reception, respectively, thus implementing full-duplex digital transmission.

Figure 4:
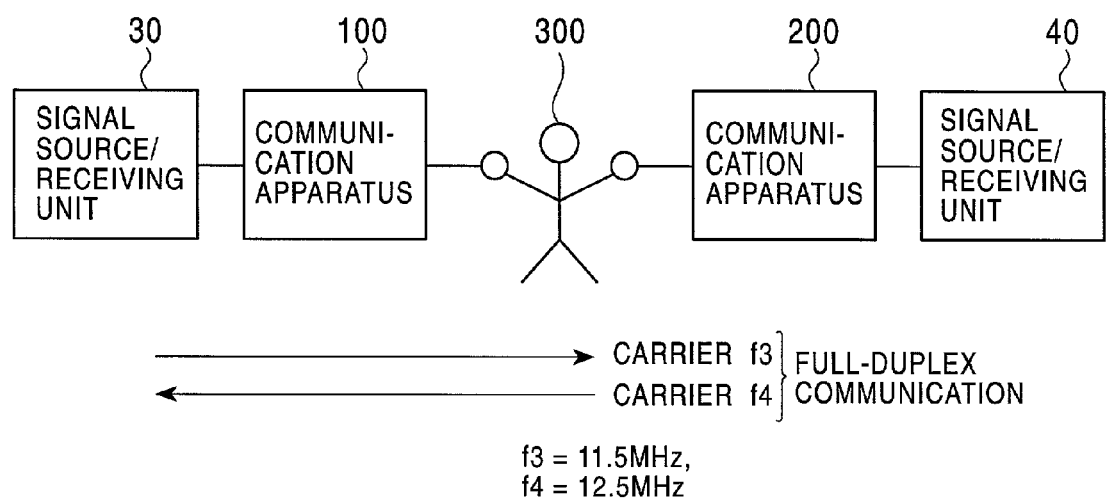
FIG. 4 is a block diagram illustrating the overall structure of a third embodiment of the present invention.

Referring to FIG. 4, the same reference numerals are given to components corresponding to those in FIG. 2 and FIG. 3. In FIG. 4, a carrier f3 and a carrier f4 are configured within a range of 11 MHz to 13 MHz. The data bit rates achieved in this system are approximately the same. It is also possible to have different bit rates. Also the carrier frequencies can be made different. Taking into consideration the practicality of the system and the symmetry of the apparatus, it is preferable that the bit rates be the same.

Figure 5:
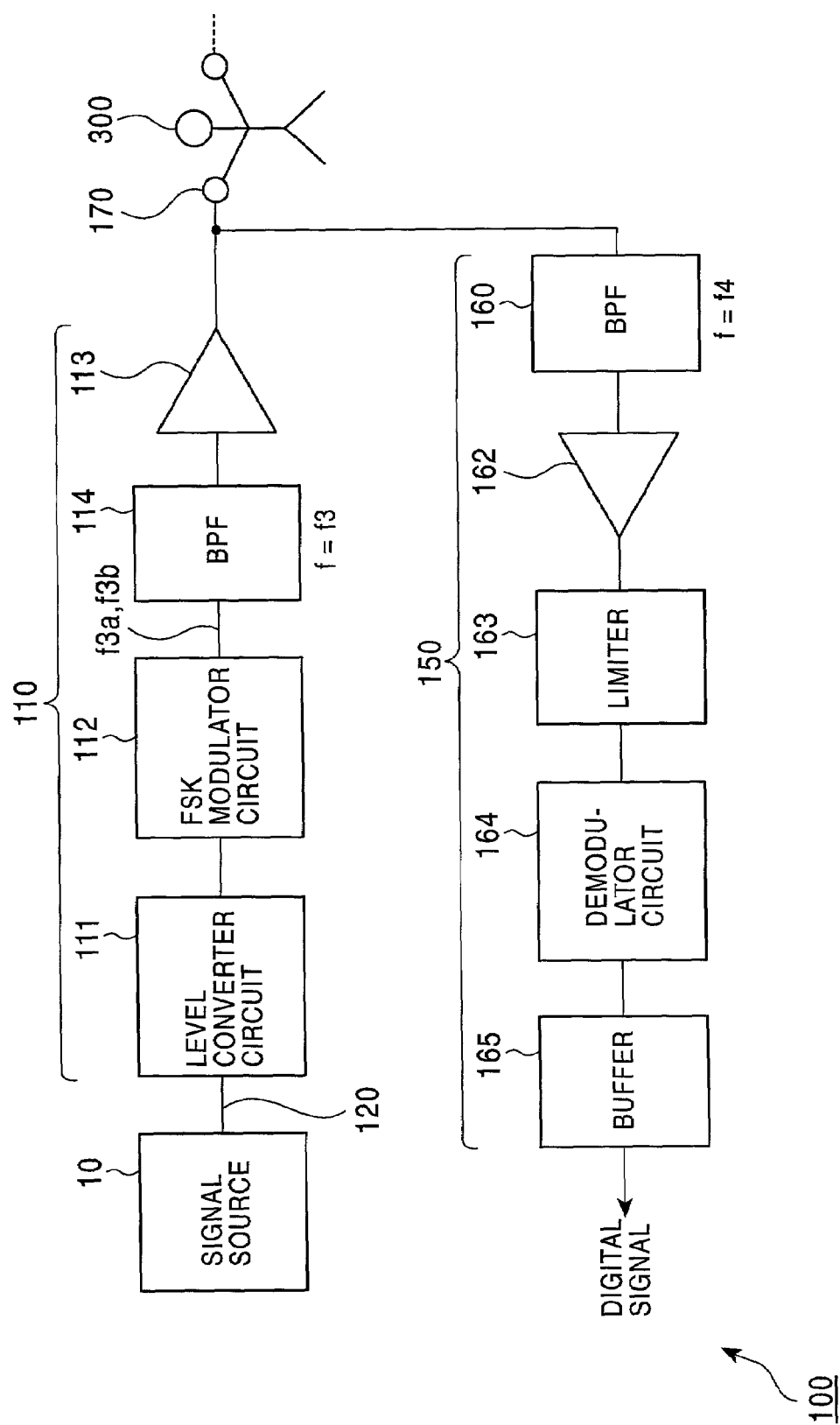
FIG. 5 is a block diagram of the detailed structure of the third embodiment.

FIG. 5 shows the detailed structure of a human-body transmission and communication apparatus 100 of the third embodiment. In FIG. 5, the same reference numerals are given to components corresponding to those in FIG. 1.

Referring to FIG. 5, a serial data signal 120, such as an RS-232C digital signal or a digital signal at a TTL level, is supplied from a digital-data signal source 10, such as a personal computer or the like. The level of the signal is appropriately converted by a level converter circuit 111, and a modulator circuit 112 operates so as to generate two frequencies (f3a and f3b). Unwanted components of the signals from the modulator circuit 112 are removed by a band pass filter 114. The resultant signals are supplied to a driver 113, and then the signals are applied to an electrode 170. In general, the driver 113 and the electrode 170 are AC-coupled by a capacitor. This is not described since it is not essential. The electrode 170 comes into contact with a human body 300 serving as a transmission channel.

At the same time, the signals transmitted through the human body 300 are received by the electrode 170. Subsequently, components having f4 as the center frequency are removed from these signals by the band pass filter 160. The signals having passed through the band pass filter 160 are amplified by a pre-amplifier 162, and the amplified signals are supplied to a demodulator circuit 164 through a limiter 163. The demodulated signals are converted to digital signals at desirable signal levels by a buffer (level converter) 165. These signals are supplied to an RS-232C input or the like of a personal computer or the like.

FIG. 5 shows only one of a pair of human-body transmission and communication apparatuses. In practice, another human-body transmission and communication apparatus is necessary.

Although he embodiments are described in detail above, the present invention is not limited to those embodiments. The invention is intended to cover various modifications included within the spirit and scope thereof. It is possible to use various modulation systems including amplitude modulation, such as amplitude shift keying (ASK) or the like, and a spread spectrum system. When the human body is used as a transmission channel, it is preferable to use a band of approximately 2 MHz to 30 MHz. It is also possible to use various bands within this range. It is not limited to specific frequencies, such as 2.3 MHz, 2.8 MHz, or 11 MHz.

What is claimed is:

1. A duplex-system digital data transmitting apparatus comprising:

first receiving means for receiving a digital signal from a digital source;

converting means for converting the digital signal into a signal in a form that is transmittable through a human body;

frequency-modulation means for frequency-modulating the digital signal into a signal in a band that is transmittable through the human body;

transmitting means for transmitting the frequency-modulated signal to the human body;

second receiving means for receiving the frequency-modulated signal from the human body;

reconverting means for reconverting the signal transmitted through the human body into the original signal by use of a receiver;

demodulating means for demodulating the received frequency-modulated signal into the original digital signal;

output means for outputting the demodulated digital signal;

wherein transmission of the signal to the human body and reception of the signal from the human body are performed using a duplex transmission system;

wherein said frequency-modulation means includes a function for performing frequency modulation in a plurality of different frequency bands, said demodulating means demodulates the frequency-modulated signals in the frequency bands;

wherein data rates of transmission channels formed by modulating the frequency bands are different, and one transmission channel is used to monitor a connection state for maintaining group delay and phase characteristics of another transmission channel, thus maintaining connection quality of the other transmission channel;

wherein the transmitter includes a first level converter circuit which converts a level of the digital signal, and wherein the receiver includes a second level converter circuit which converts a level of the signal from the human body.

2. A duplex-system digital data transmitting method comprising:

first receiving a digital signal from a digital source;

converting the digital signal into a signal in a form that is transmittable through a human body;

frequency-modulating the digital signal into a signal in a band that is transmittable through the human body;

transmitting the frequency-modulated signal to the human body;

second receiving the frequency-modulated signal from the human body;

reconverting the signal transmitted through the human body into the original signal by use of a receiver;

demodulating the received frequency-modulated signal into the original digital signal;

outputting the demodulated digital signal;

wherein transmitting the signal to the human body and receiving the signal from the human body are performed using a duplex transmission system;

wherein frequency-modulating includes a function for performing frequency modulation in a plurality of different frequency bands, said demodulating demodulates the frequency-modulated signals in the frequency bands;

wherein data rates of transmission channels formed by modulating the frequency bands are different, and one transmission channel is used to monitor a connection state for maintaining group delay and phase characteristics of another transmission channel, thus maintaining connection quality of the other transmission channel;

wherein the transmitting includes a first level converter circuit which converts a level of the digital signal, and wherein the receiving includes a second level converter circuit which converts a level of the signal from the human body.

* * * * *